(12) United States Patent
Frink et al.

(10) Patent No.: US 9,166,918 B1
(45) Date of Patent: Oct. 20, 2015

(54) METHODS AND APPARATUS FOR SCHEDULING TRANSMISSION OF DATA IN A NETWORK

(71) Applicant: Juniper Networks, Inc., Sunnyvale, CA (US)

(72) Inventors: Craig R. Frink, Chelmsford, MA (US); Gerald Lampert, Hopkinton, MA (US); Steven Aiken, Pepperell, MA (US); Srihari R. Vegesna, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 169 days.

(21) Appl. No.: 14/042,023

(22) Filed: Sep. 30, 2013

(51) Int. Cl.
*H04L 12/28* (2006.01)
*H04L 12/825* (2013.01)
*H04L 12/815* (2013.01)
*H04L 12/869* (2013.01)

(52) U.S. Cl.
CPC .............. *H04L 47/25* (2013.01); *H04L 47/225* (2013.01); *H04L 47/60* (2013.01)

(58) Field of Classification Search
None
See application file for complete search history.

(56) References Cited

U.S. PATENT DOCUMENTS

| 6,307,852 | B1 * | 10/2001 | Fisher et al. ................... 370/352 |
| 7,719,977 | B2 * | 5/2010 | Sisto et al. ..................... 370/230 |
| 2006/0067225 | A1 * | 3/2006 | Fedorkow et al. ............. 370/235 |
| 2008/0091857 | A1 * | 4/2008 | McDaniel ........................ 710/72 |

* cited by examiner

*Primary Examiner* — John Blanton
(74) *Attorney, Agent, or Firm* — Cooley LLP

(57) ABSTRACT

In some embodiments, an apparatus includes a transmission schedule module in at least one of a memory or a processing device that can select, at a first time, a data unit to send to a network device based at least in part on a value of a transmission rate counter indicating that the network is in a first state. The transmission schedule module can receive, at a second time, an indication of a number of buffers associated with the data unit and can calculate a size estimate of the data unit based on the number of buffers and a capacity associated with each buffer. The transmission schedule module can calculate at a third time, a temporary transmission rate count and can send a signal to transition the network device from the first state to a second state if the temporary transmission rate count meets a criterion.

20 Claims, 5 Drawing Sheets

METHODS AND APPARATUS FOR SCHEDULING TRANSMISSION OF DATA IN A NETWORK

BACKGROUND

Some embodiments described herein relate generally to methods and apparatus for scheduling transmission of data in a computer network. In particular, but not by way of limitation, some of the embodiments described herein relate to methods and apparatus for speculatively shaping the transmission of data to reduce the data burst sizes in a scheduling system associated with a network.

Data scheduling systems (or modules) in high speed networks (e.g., 100 Gbps networks) can typically scale to large sizes with, for example, 1M (where $M=1\times10^6$) buffers that can cause certain data structures to be placed in external (off-chip) memory. In such instances, large memory latency can affect the speed with which the data scheduling system can respond to changes in the number of transmission credits assigned to the different network devices in the network. This can affect the number of data units that are transmitted to a network device in excess of the pre-determined transmission credit limits assigned for each network device and/or a queue in the network.

It is desirable for a transmission data scheduler in high-speed networks to deduct a byte length of the data units scheduled for transmission to the network device from the transmission credit queue associated with that network device prior to scheduling additional data units to be sent to the network device. Such a sequence allows the transmission data scheduler to suspend scheduling of further data units if the data units scheduled to the network device and/or the queue has exceeded the transmission credit value associated with that queue and/or network device. This, however, presents memory latency issues. If, however, the transmission data scheduler schedules multiple data units to be sent to the network device prior to deducting the transmission credits, a greater number of data units than allowed by the transmission credit queue may be scheduled, adversely affecting data traffic.

Accordingly, a need exists for methods and apparatus for dynamically scheduling transmission of data units in a network by speculatively shaping the transmission of data units to reduce the data unit burst sizes associated with a hierarchical network.

SUMMARY

In some embodiments, an apparatus includes a transmission schedule module in at least one of a memory or a processing device that can select, at a first time, a data unit to send to a network device from a set of network devices based at least in part on a value of a transmission rate counter at the first time indicating that the network device is in a first state. In such embodiments, the transmission schedule module can receive, at a second time after the first time, an indication of a number of buffers from a set of buffers associated with the data unit. The transmission schedule module can calculate a size estimate of the data unit based on the indication of the number of buffers and a capacity associated with each buffer from the set of buffers. In such embodiments, the transmission schedule module can calculate, based on the size estimate and a value of the transmission rate counter at a third time after the second time, a temporary transmission rate count. The transmission schedule module can also send a signal to transition the network device from the first state to a second state if the temporary transmission rate count meets a criterion.

DETAILED DESCRIPTION

Figure 1:
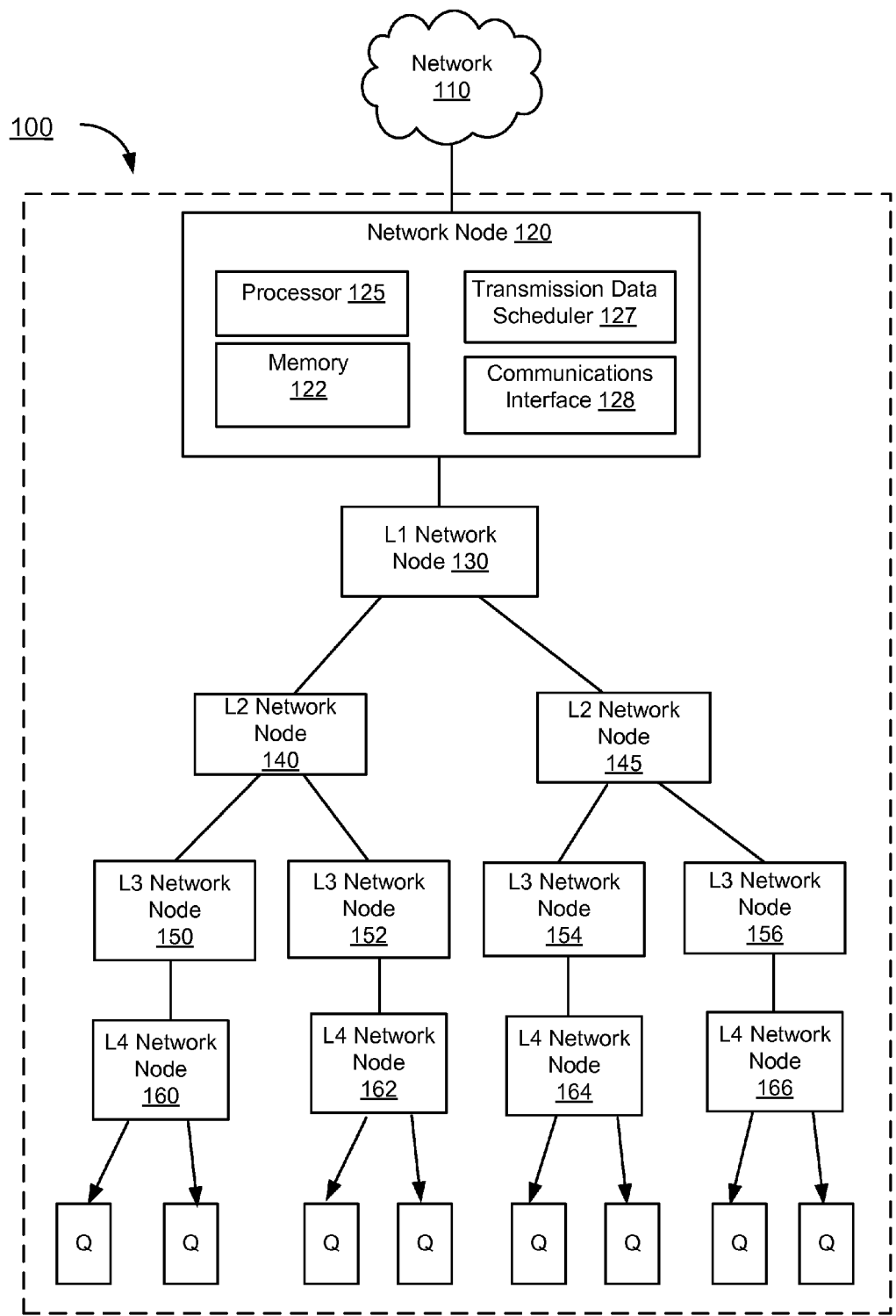
FIG. 1 is a schematic illustration of a hierarchical network, according to an embodiment.

In some embodiments, an apparatus includes a transmission schedule module in at least one of a memory or a processing device that can select, at a first time, a data unit to send to a network device (e.g., network node and/or queue) from a set of network devices based at least in part on a value of a transmission rate counter at the first time indicating that the network device is in a first state. In such embodiments, the transmission schedule module can receive, at a second time after the first time, an indication of a number of buffers from a set of buffers associated with the data unit. The transmission schedule module can calculate a size estimate of the data unit based on the indication of the number of buffers and a capacity associated with each buffer from the set of buffers. In such embodiments, the transmission schedule module can calculate, based on the size estimate and a value of the transmission rate counter at a third time after the second time, a temporary transmission rate count. The transmission schedule module can also send a signal (e.g., to set a flag or other indicator in a memory or another module) to transition the network device from the first state to a second state if the temporary transmission rate count meets a criterion. In some embodiments, the set of buffers storing the data unit can be stored in a memory on a chip different than the chip implementing the transmission schedule module.

In some embodiments, a method includes receiving at a first time, an indication of a data unit to send to a network device from a set of network devices, where each network device is associated with a level from a set of levels within a hierarchy of a network. The method includes receiving at a second time after the first time, an indication of a number of buffers from a set of buffers associated with the data unit and estimating based on the indication of the number of buffers and a capacity associated with each buffer from the set of buffers, a size associated with the data unit to produce a size estimate. The method also includes calculating based on the size estimate and a value of the transmission rate counter at the first time, a temporary transmission rate count. The method further includes sending (e.g., to set a flag or other indicator in a memory or another module) at a third time after the second time, a signal to suspend scheduling transmission of data to the network device in response to the temporary transmission count meeting a criterion.

In some embodiments, an apparatus includes a transmission rate count module implemented in at least one of a memory or a processing device that can store a value associated with transmission credits for a network device from a set of network devices. In such embodiments, the apparatus also includes a transmission schedule module operatively coupled to the transmission rate count module, where the transmission schedule module can select at a first time, a data unit to send to the network device based at least in part on the value at the first time not meeting a criterion. The transmission schedule module can calculate based on a size estimate associated with the data unit and a value at a second time after the first time and associated with transmission credits for a network device, a temporary transmission count. The transmission schedule module can send a signal (e.g., to set a flag or other indicator in a memory or another module) to suspend scheduling transmission of data to the network device in response to the temporary transmission count meeting a criterion. In such embodiments, the transmission rate count module can receive at a third time after the second time, an indication of an actual size associated with the data unit. The transmission rate count module can update a value at the third time and associated with transmission credits for the network device based on the actual size associated with the data unit.

As used in this specification, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "a network device" is intended to mean a single network device or multiple network devices. For another example, the term "a criterion" can mean a single criterion or multiple criteria.

FIG. 1 is a schematic illustration of a hierarchical network, according to an embodiment. The network 100 includes multiple network devices (network nodes and/or queues). Specifically, the network 100 includes a network node 120, a level 1 (L1) network node 130, level 2 (L2) network nodes 140 and 145, level 3 (L3) network nodes 150-156, level 4 (L4) network nodes 160-166 and a set of queues (each represented by "Q"). The network 100 can be any type of network (e.g., a local area network (LAN), a wide area network (WAN), a virtual network, and a telecommunications network) implemented as a wired network and/or wireless network and can be operably coupled to any external network 110. The external network 110 can be, for example, a data center network, a wide area network (WAN), the Internet, etc.

The network node 120 can be, for example, a compute node, a service node, a router, etc. The network node 120 can include a memory 122, a processor 125, a communications interface 128 and a transmission data scheduler 127. The memory 122 can be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory 122 can store instructions to cause the processor 125 to execute modules, processes and/or functions associated with the network node 120. The memory 122 can include a set of buffers (not shown in FIG. 1) where each buffer is a finite sized location in the memory 122 (e.g., a finite sized buffer "chunk") of the network node 120 and has a specific data structure where, for example, data units and/or control instructions are stored and held to be processed at a later time. In other words, a buffer is a particular kind of abstract data type in which entities such as data units and/or control instructions are stored in order. In some configurations, the principal operations performed on the buffer can be the addition of new entities to the rear terminal position of the queue, and removal of currently stored entities from the front terminal position of the queue. In such configurations, a buffer can be termed as a First-In-First-Out (FIFO) data structure. In some instances, the memory 122 can also include transmission rate counters associated with each network device (e.g., network node and/or queue) in the network 100, where the transmission rate counters can store and/or count the value of the transmission credits associated with each network node and/or queue in the network 100 in every transmission credit update period. In other embodiments, such transmission rate counters can be included in an on-chip memory of the transmission data scheduler 127 as described in further detail herein.

The processor 125 can be, for example, a general purpose processor, a Field Programmable Gate Array (FPGA), an Application Specific Integrated Circuit (ASIC), a Digital Signal Processor (DSP), and/or the like. The processor 125 can be configured to run and/or execute application processes and/or other modules, processes and/or functions associated with the network node 120 and/or the network (e.g., network 100 in FIG. 1). Each of the other network nodes 130, 140, 145, 150-156, 160-166 also includes a memory and a processor (not shown in FIG. 1).

The network node 120 can be configured to receive data units and/or send data units (e.g., data packets, data cells, etc.) through one or more ports of the communication interface 128, which is operably coupled to the communication interfaces of the different network devices and/or modules in the network 100. The communication interface 120 can include one or multiple wired and/or wireless ports. The wireless port(s) in the communication interface 120 can send and/or receive data units via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol) and/or the like. The wired port(s) in the communication interface 120 can send and/or receive data units via implementing a wired connection(s) between communications interface 120 of the network node 120 and the communications interface of the external network 110 and/or the network devices within network 100. The wired connections can be, for example, twisted-pair electrical signaling via electrical cables, fiber-optic signaling via fiber-optic cables, and/or the like. In some instances, the network node 120 can perform a variety of operations (e.g., data unit header encapsulation, data unit header decapsulation, etc.) on incoming and/or outgoing data units before sending and/or receiving data units.

The network node 120 also includes a transmission data scheduler 127 that can be a hardware module and/or software module (stored in memory 122 and/or executed in the processor 125 of the network node). In other configurations, the transmission data scheduler 127 can be a stand-alone hardware module (separate from processor 125) that can include or be operatively coupled to a set of finite-sized buffers or buffer chunks (not shown in FIG. 1). In some embodiments, the set of finite-sized buffers or buffer chunks can be implemented in a memory on a chip different than the chip implementing the transmission data scheduler 127. For example, in some embodiments, the set of finite-sized buffers or buffer chunks can be implemented in memory 122, which can be off-chip from the transmission data scheduler 127.

The transmission data scheduler 127 can select, at a first time, a data unit to send to a network device (e.g., network nodes 130, 145, 145, 150-156, 160-166 or queues Q in FIG. 1)

based at least in part on a value stored in an on-chip memory of the transmission data scheduler (e.g., a transmission rate count module associated with a specific network device, as described in further detail herein) at a first time that indicates that the network device is in a first state (e.g., data units can be sent to that network device per a shaped rate). The transmission data scheduler 127 can receive at a second time after the first time an indication of a number of buffers (or buffer chunks) from a set of buffers associated with the data unit to be sent to the network device (e.g., from memory 122). The transmission data scheduler 127 can calculate a size estimate of the data unit based on the number of buffers and the capacity of each buffer from the set of buffers. The transmission data scheduler 127 can calculate based on the size estimate of the data unit and a value of the transmission rate count module at a third time after the second time, a temporary transmission rate count. In some instances, the transmission data scheduler 127 can transition the network node and/or the queue from the first state (in which the transmission data scheduler 127 schedules data units to be sent to the destination device) to a second state (in which the transmission data scheduler 127 suspends scheduling data units to be sent to the destination device) if the temporary transmission rate count meets a criterion. In such instances, the network node and/or the queue is temporarily uninstalled and/or deactivated by the transmission data scheduler 127 and the transmission data scheduler 127 does not schedule additional data units to be sent to that network node and/or queue when in the second state. In such instances, the criterion indicates that the data units scheduled for transmission to the network node and/or the queue have exceeded the transmission credit value associated with the network node and/or the queue in a given time period (e.g., a transmission credit update period).

Figure 2:
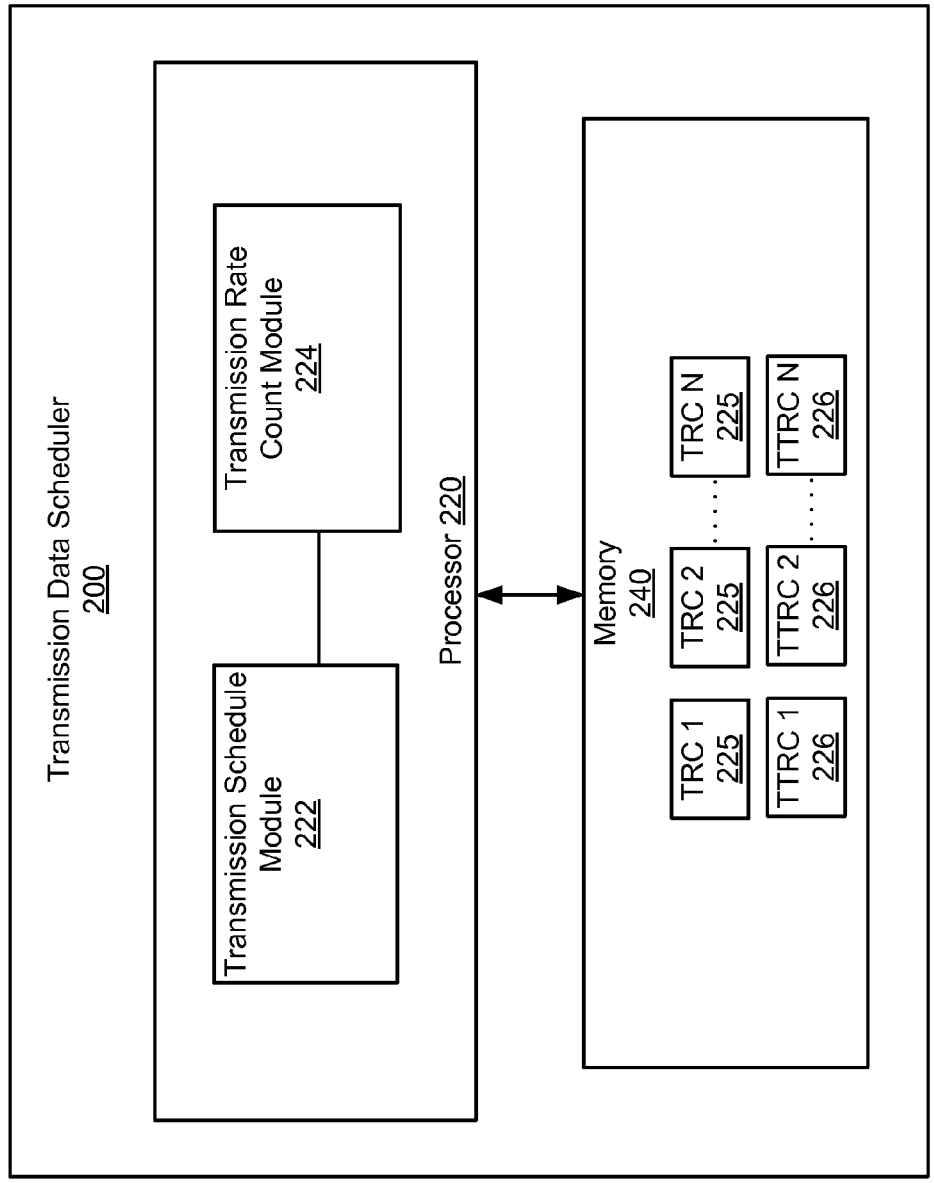
FIG. 2 is a system block diagram of a transmission data scheduler, according to an embodiment.

A transmission credit can provide an indication or a representation of a rate at which a network device can transmit data units to other network devices from the set of network devices (e.g., network nodes 130, 145, 145, 150-156, 160-166 or queues Q in FIG. 1) in the network 100. The transmission data scheduler 127 can also select a maximum value of the transmission rate count module for each network node and/or a queue based on the rate at which transmission credits are provided to the transmission rate count module over a period of time that includes the first time, the second time and the third time discussed above. A detailed description of the logical organization and the function of the transmission data scheduler 127 is shown in FIG. 2 and further discussed below.

In some embodiments, the transmission data scheduler 127 can periodically receive additional transmission credits associated with each network device. In such embodiments, the transmission data scheduler 127 can modify a transmission rate counter associated with that network device. Receiving additional transmission credits allows the transmission data scheduler 127 to schedule sending additional data units to the network device associated with that transmission rate counter. The distribution of transmission credits is described in further detail in U.S. patent application Ser. No. 14/014,849, filed Aug. 30, 2013, and entitled "Methods And Apparatus For Implementing Dynamic Rate Controllers Using Linked List Of Rate Programs," which is incorporated herein by reference in its entirety.

The L1 network node 130 can be, for example, a core network switch that can manage wired/wireless network nodes and/or wired/wireless user sessions within the network 100. In some instances, the L1 network node 130 can forward data units of wired and/or wireless communication sessions between an L2 network node 140 or 145 and the external network 110 that is operatively coupled to the L1 network node 130 (via the network node 120). In some instances, the L1 network node 130 can also initiate and/or establish a wired and/or wireless communication session between L2 network nodes 140 and 145. In other instances, the L1 network node 130 can establish and/or maintain a tunnel for the bi-directional transport of data units from, for example, an L4 network node 160-164 to, for example, the L1 network node 130. Examples of tunnels include a Multiprotocol Label Switching (MPLS) tunnel, an Ethernet-over-layer-3 tunnel, a Generic Routing Encapsulation (GRE), and/or the like. In some instances, the L1 network node 130 can be referred to as a core SRC (switch, router, and controller).

The L2 network nodes 140 and 145 can be, for example, an aggregation network switch, a digital subscriber line access multiplexer (DSLAM), and/or the like. Specifically, the functionality of the L2 network node 140 and 145 can include multiplexing, switching and/or routing data traffic, including data units of wired network sessions and data units of wireless network sessions, to the L1 network node 130 by implementing one or multiple local switching and/or forwarding and classification protocols. In some instances, if a tunnel is established between the L3 network nodes 150-156 and the L1 network node 130, L2 network nodes 140 and 145 can forward data units from the L3 network nodes 150-156 to the L1 network node 130 (or vice versa) through the tunnel without implementing local switching or complex forwarding and classification functionality.

The L3 network nodes 150-156 can be any network device that can connect an L4 network node (e.g., any subscriber premise equipment or device) to the network 100. In some instances, the L3 network nodes 150-156 can be any device that connects one or more wired subscriber premise devices to the network 100. In such instances, the L3 network nodes 150-156 can be, for example, a hub, an Ethernet switch, etc. The L3 network nodes 150-156 can be operably coupled to a wired L4 network node 160-166 via a wired connection such as, for example, twisted-pair electrical signaling via electrical cables, fiber-optic signaling via fiber-optic cables, and/or the like. In other instances, the L3 network nodes 150-156 can be any device that connects one or more wireless subscriber premise devices to the network 100. In such instances, the L3 network nodes 150-156 can be, for example, a wireless access point (WAP), and can be operably coupled to a wireless L4 network node 160-166 (e.g., a Wi-Fi enabled laptop, a mobile phone) via a wireless connection such as, for example, a wireless fidelity (Wi-Fi®) connection, a Bluetooth® connection, a cellular connection (e.g., a third generation mobile telecommunications (3G) or a fourth generation mobile telecommunications (4G) connection) and/or the like. More specifically, L3 network nodes 150-156 can forward data units between one or more L4 network nodes 160-166 and the L1 network node 130. Data units sent and/or received by the L3 network nodes 150-156 can include or represent, for example, voice data, textual data, video data, audio data, and/or combinations of the same.

The L4 network nodes 160-166 can be any subscriber premise equipment such as, for example, a web server, an application server, a proxy server, a telnet server, a file transfer protocol (FTP) server, a mail server, a list server, a collaboration server, or a personal computing device such as, for example, a desktop computer, a laptop computer, a personal digital assistant (PDA), a standard mobile telephone, a tablet personal computer (PC), and/or so forth. The L4 network nodes 160-166 can send data units to and/or receive data units from the network 100 and/or the external network 110 via the L3 network nodes 150-156. Each L4 network node 160-166 is associated with and/or includes one or multiple queues (denoted by "Q" in FIG. 1). A queue (also known as a receive queue) has a finite sized location in the memory of the L4 network nodes 160-166 and is a specific data structure where, for example, data units are stored and held to be processed at a later time. In some configurations, the operations performed on the queue can also include the addition of new entities to the rear terminal position of the queue, and removal of currently stored entities from the front terminal position of the queue. In such configurations, a queue can also be termed as a First-In-First-Out (FIFO) data structure. Hence, queues (Q's) can perform the function of a buffer and are a part of the memory (not shown in FIG. 1) of the L4 network nodes 160-166.

While a specific embodiment of a hierarchical network has been described in FIG. 1, it should be understood that it has been presented by way of example only, and not limitation. In other embodiments, the hierarchical network can include additional levels of network devices such as, for example, level-5 (L5) network devices, level-6 (L6) network device, and/or the like. In still other embodiments, the hierarchical network can include a fewer number of levels of network devices than shown, such as, for example, a single level, two levels, etc. Additionally, in other embodiments, the hierarchical network 100 can include more than one L1 device, more than two L2 network devices, more than four L3 network devices, more than four L4 network devices, and/or the like. Moreover, while specific examples have been provided for the different layers of network devices (L1-L4), in other embodiments, the network nodes 130-166 can be any suitable network nodes such as, for example, switches, routers, hubs, bridges, gateways, DSLAMs, customer premises equipment, and/or the like. For example, while the L1 network node 130 is described as a core network switch, in other embodiments, the L1 network node 130 can be an aggregation switch, an access switch, a router, a DSLAM and/or any other suitable network device.

FIG. 2 is a system block diagram of a transmission data scheduler, according to an embodiment. The transmission data scheduler 200 is structurally and functionally similar to the transmission data scheduler 127 shown in FIG. 1. In some configurations, the network node 120 shown in FIG. 1 can include a processor and a memory within which transmission data scheduler 200 can be embodied as a hardware module and/or software module. In other configurations, the transmission data scheduler 200 can be a stand-alone hardware module (e.g., an ASIC) that can include or be operatively coupled to a set of finite-sized buffers or buffer chunks (not shown in FIG. 2). As shown in FIG. 2, the transmission data scheduler 200 includes a processor 220 and a memory 240. As discussed above, in some embodiments, the set of buffers storing the data unit can be stored in a memory on a chip different than the chip implementing the transmission schedule module. For example, the set of buffers can be stored in memory 122 of FIG. 1 that is not included in the transmission data scheduler 127 (e.g., is off-chip from the transmission data scheduler 127).

The memory 240 can be, for example, a random access memory (RAM), a memory buffer, a hard drive, a database, an erasable programmable read-only memory (EPROM), an electrically erasable read-only memory (EEPROM), a read-only memory (ROM), a content addressable memory (CAM), and/or so forth. The memory 240 can store instructions to cause the processor 220 to execute modules, processes and/or functions associated with the transmission data scheduler 200. As shown in FIG. 2, the memory 240 can also store transmission rate counters 225 associated with each network device in a network (e.g., network 100 of FIG. 1). Accordingly, each transmission rate counter 225 can be associated with a different network device in the network. A transmission rate counter 225 can be incremented when the transmission data scheduler 200 receives transmission credits for its associated network device. Similarly, as discussed in further detail herein, the transmission rate counter 225 for a network device can be decremented when the transmission data scheduler 200 schedules and/or sends a data unit to its associated network device. For example, the memory 240 can store the values generated by the transmission rate count module 224 in the transmission rate counters 225 at any time or clock cycle such as, for example, a first time, and the values generated by the transmission rate count module 224 at a second set of times (where a second set of times includes a pre-determined number of times periods or clock cycles before the first time). In other embodiments, the transmission rate counters can be, for example, a register in the processor of the transmission data scheduler.

The memory 240 can also include and/or store temporary transmission rate counters 226 for each network device in a network (e.g., network 100 of FIG. 1). Each temporary transmission rate counter 226 can include a temporary transmission rate count value that is computed by the transmission rate count module 224 based on (1) the number of buffer chunks within a set of buffer chunks associated with a data unit, and (2) a capacity associated with each buffer chunk from the set of buffer chunks associated with that data unit. Such temporary transmission rate count values are associated with a network node and/or a queue in the hierarchical network (e.g., network 100 in FIG. 1).

In yet another example, the memory 240 can store a chunk pointer queue (CPQ) that is a linked list of blocks in the memory 240 that includes the head pointer and tail pointer for the different data units associated with the network nodes and/or queues in the network. Additionally, the CPQ can also include the byte length of a data unit. The byte length of a data unit can be defined as the integer and/or fractional space occupied by a data unit or a portion of a data unit within a fixed sized buffer or a buffer chunk (e.g., a buffer chunk can be 128B in size). In other embodiments, the CPQ can be stored in off-chip memory, such as, for example, memory 122 shown and described in FIG. 1.

The processor 220 can be, for example, a general purpose processor, a Field Programmable Gate Array (FPGA), an Application Specific Integrated Circuit (ASIC), a Digital Signal Processor (DSP), and/or the like. The processor 220 can be configured to run and/or execute application processes and/or other modules, processes and/or functions associated with the transmission data scheduler 200. The processor 220 includes a transmission schedule module 222 and a transmission rate count module 224. Although the transmission schedule module 222 is shown in FIG. 2 as a hardware module within processor 220, the transmission schedule module alternatively can be a software module stored in the memory of the transmission data scheduler.

The transmission schedule module 222 is operatively coupled to the transmission rate count module 224 and can identify data units to send to different network nodes and/or queues in the network. For example, the transmission schedule module 222 can select at a first time, a data unit to send to a network device from a set of network devices based at least in part on a value provided and/or calculated by the transmission rate count module 224 (e.g., a value of the transmission rate counter 225 and/or the temporary transmission rate counter 226 associated with transmission credits for that network device). The value provided and/or calculated by the transmission rate count module 224 is typically non-negative at the first time so that the transmission schedule module 222 selects a data unit to send to the network device at the first time (in such instances, the network device can be said to be in a first state).

The transmission schedule module 222 can receive at a second time after the first time, a signal that is representative of the number of buffers (or buffer chunks) from a set of buffers associated with that data unit (e.g., a number of buffers in which that data unit is stored). The signal can be received at the transmission schedule module 222 from, for example, the CPQ stored in the memory 240 of the transmission data scheduler 200 or in off-chip memory (e.g., memory 122 of FIG. 1). Note that the size of the data unit stored in a buffer from the set of buffers at the second time can be different than the capacity associated with the buffer. For example, a data unit with a size of 100B can be stored in a single buffer with a size of 128B. For another example, a data unit with a size of 300B can be stored in three 128B buffers. The transmission schedule module 222 can calculate a size estimate of the data unit based on the signal representative of the number of buffers within a set of buffers within which the data unit is stored and the capacity associated with each buffer from the set of buffers. The transmission schedule module 222 can calculate at a third time after the second time, a temporary transmission rate count based on the size estimate and a value of the transmission rate counter 225 at the third time (i.e., the value stored in the transmission rate counter 225 should be non-negative at the third time).

In some instances, the value of the temporary transmission rate count can be non-negative (i.e., positive value of the transmission credits stored or accumulated for the network device). In such instances, the transmission schedule module 222 can schedule the data unit to be sent to the network node and/or a queue (i.e., maintain the network device in the first state); when the network device is in the first state, the transmission schedule module 222 is enabled to schedule transmission of a data unit to the network device. In other instances, the value of the temporary transmission rate count can be negative (i.e., negative value of the transmission credits stored or accumulated for the network device). In such instances, the transmission schedule module 222 can transition the network device from the first state to a second state; in the second state, the transmission schedule module 222 can suspend scheduling transmission of data units to the network device. The transmission schedule module 222 can also select a maximum value of the transmission rate counter 225 for nodes and/or queues in the network based on a rate at which transmission credits are provided to the transmission rate counter 225 over a period of time that includes the first time, the second time and the third time discussed above.

In some embodiments, a flag or other indicator within the transmission data scheduler 200 (e.g., stored in memory 240) can indicate the state of the network device. For example, the memory 240 can include a flag and/or other indicator for each network node 130-166 and/or each queue Q. When a transmission rate counter 225 associated with a specific network device meets a criterion, the transmission schedule module 222 can send a signal to change the flag and/or indicator to indicate that the transmission schedule module 222 should no longer schedule data transmission to that network node and/or queue (also referred to as uninstalling a network node and/or queue). Similarly, when the transmission rate counter 225 associated with that network device no longer meets the criterion (e.g., as a result of receiving additional transmission credits, or because of an overestimate of the size of data sent to that network device), the flag and/or indicator can be changed to indicate that the transmission schedule module 222 can schedule additional data units to be sent to that network device (also referred to as reinstalling a network node and/or queue).

Although the transmission rate count module 224 is shown in FIG. 2 as a hardware module within processor 220, the transmission rate count module alternatively can be a software module stored in the memory 240 of the transmission data scheduler 200. The transmission rate count module 224 is operably coupled to the transmission schedule module 222. The transmission rate count module 224 can be configured to control and/or maintain the transmission rate counters 225 and/or the temporary transmission rate counters 226. For example, the transmission rate count module 224 can increment and/or decrement the transmission rate counters 225 based on the transmission schedule module 222 scheduling data units to be sent to a specific network device and/or based on receiving additional transmission credits for a network device. For another example, the transmission rate count module 224 can send an indication or a signal to the transmission schedule module 222 that is indicative of a value of one or more transmission rate counters 225 and/or temporary transmission rate counters 226.

In some embodiments, the transmission rate count module 222 can also generate, estimate or predict a temporary transmission count value for the size of the data unit based on (1) the number of buffers (or buffer chunks) from a set of buffers (e.g., stored in off-chip memory 122 of FIG. 1) associated with the data unit and (2) a capacity associated with each buffer. Additionally, the transmission rate count module 224 can also generate (1) the byte count and/or the byte size of the transmission credits remaining for a network node and/or a queue based on the actual byte count of the data unit transmitted to a network node and/or queue, and (2) the byte count of the transmission credits accumulated for the network node and/or queue in a given time period (e.g., a transmission credit update period). The transmission rate counters 225 can be updated periodically or substantially periodically by the transmission rate count module 224 to reflect the current configuration of the network 100.

Referring to FIGS. 1-2, a method for scheduling transmission of data units to the various nodes and/or queues in a network 100 includes scheduling individual data units that are subdivided and/or stored into buffer chunks of a fixed size (e.g., 128B) in an external or off-chip memory (e.g., memory 122 in FIG. 1). In such a method, when a buffer chunk is processed by the transmission data scheduler (e.g., transmission data scheduler 200 in FIG. 2), the number of bytes in each buffer chunk is deducted from the byte size of the transmission credits associated with (or accumulated for) a network node and/or a queue in the network (i.e., from the transmission rate counter 225 associated with that network node and/or queue). In some instances, when the result of such deductions is negative (i.e., byte size of data unit scheduled for transmission to network device is greater than byte size of the transmission credits associated or accumulated for a network device), the transmission schedule module suspends scheduling additional data units to be sent to the network device. In other instances, when the result of such deductions is positive (i.e., the byte size of the data units scheduled for transmission to a network device is less than the byte size of the transmission credits associated or accumulated for that network device), the transmission schedule module can schedule additional data units to be sent to the network device.

When determining whether to suspend scheduling data units to be sent to a network device (also referred to uninstalling the network device), the latency or time delay typically associated with the transmission data scheduler 200 performing an external memory fetch step (e.g., on the order of hundreds of clock cycles) is included in the calculation of the new transmission credit value (e.g., stored in the transmission rate counter 225 associated with that network device) associated with a network node and/or queue (new transmission credit value=byte length of stored transmission credit−byte length of buffer chunks associated with a scheduled data unit). In such methods, the transmission data scheduler 200 can avoid the high latency associated with such external memory fetching events by performing an estimate of the byte length and/or size of the scheduled data unit using the number of the buffer chunks associated with the data unit and a capacity of each buffer chunk. Such an estimate can be stored and/or calculated using the temporary transmission rate counter 226 associated with that network node and/or queue. This estimation of the byte size of the data unit can be referred to as a speculative charge. Hence, in such speculative charging methods, an estimate (i.e., not exact value) of the byte size of the new transmission credits associated with a network node and/or queue can be calculated when the number of buffer chunks associated with a scheduled data is being processed by the transmission data scheduler 200, which can be performed earlier than an external memory fetch event or reference being performed by the transmission data scheduler 200. Hence, the estimation of the byte size of the new transmission credit value associated with a network node and/or queue can be achieved with reduced latency (as the external memory fetch event is avoided). Estimating the byte size of a data unit also reduces an amount of over-scheduling that can occur when processing multiple data units to be sent to a network device in parallel (e.g., using different threads as described in further detail herein).

In such methods, the speculative charging or size estimation does not change the stored transmission credits stored (or accumulated) in the transmission rate counter 225 stored in either an on-chip memory (e.g., memory 240 in FIG. 2) or an off-chip memory (e.g., memory 122 in FIG. 1). Instead, for example, an "Pending Chunk Count" (PCC) can be stored in the on-chip memory 240 (e.g., in a temporary transmission rate counter 226 associated with that network node and/or queue).

In such methods, the external memory fetch event is performed by the transmission schedule module 222 at a later time (e.g., after hundreds of clock cycles) to access the actual byte size (or byte count) of the scheduled data unit stored across different buffer chunks in an off-chip memory (e.g., memory 122 in FIG. 1). The transmission credits stored in the transmission rate counter 225 associated with that network device can be updated or adjusted to reflect the actual byte size or byte count of the new transmission credits (after performing a subtraction step). If the computed actual byte size of the new transmission credits associated with a network device is non-negative after the adjustment step (that was previously estimated to be negative when a size estimate of the data unit was used in the previous step), the relevant network device can be re-installed (i.e., the transmission schedule module 222 can begin scheduling data units to be sent to that network device) by the transmission data scheduler 200 in the subsequent transmission credit update cycle. Hence, the speculative charging method described above can significantly reduce the burst size of the data units sent to a network device that can adversely affect network bandwidth and functionality.

Known transmission data schedulers of large networks are often scaled to large dimensions such as, for example, having 256K buffer chunks, 16M buffer chunks, and/or the like. In such instances, some of the CPQ data structures that indicate data unit length are located in an external or off-chip memory (e.g., memory labeled 122 in FIG. 1). Accessing external memory can have a large latency and can affect the speed with which the transmission data scheduler is able to process transmission credits as this involves determining the byte length or byte size of the data units by the transmission data scheduler.

The scheduling pipeline for a transmission data scheduler includes three principal threads that are involved in the scheduling decisions such as, for example, the dequeue (DQ) thread, the dequeue update (DQU) thread and the transmission credit update (CRU) thread. A thread is a sequence of programmed instructions that can be managed and/or processed independently by a processor (e.g., the processor labeled as 220 in FIG. 2). The scheduling decisions are made by the DQ thread for installed network devices in the network, the number of buffer chunks associated with a scheduled data unit is determined using the CPQ by the DQU thread (e.g., based on receiving a pointer to each buffer containing a portion of that data unit), and the actual byte size or byte count of the data unit is determined from the CPQ using the CRU thread (e.g., by retrieving the data unit using the pointers to the buffers storing that data unit). Each of these threads performs operations in parallel. Thus, the DQ thread performs multiple scheduling operations between the time a data unit is scheduled by the DQ thread and the number of buffer chunks associated with that data unit is determined by the DQU thread. Similarly, the DQU thread receives and/or determines the number of buffer chunks associated with multiple scheduled data units between the time it receives the pointers to each buffer containing a portion of a data unit and the time the CRU thread receives the data unit from off-chip memory. Accordingly, because such parallel processing threads are used a large number of data units can be scheduled to be sent to a network node and/or queue between an initial data unit being scheduled by the DQ thread and the CRU thread receiving the actual byte count for that data unit. This can cause over scheduling (i.e., scheduling a greater number of bytes to be sent to a network node and/or queue than available transmission credits for that network node and/or queue).

Figure 3:
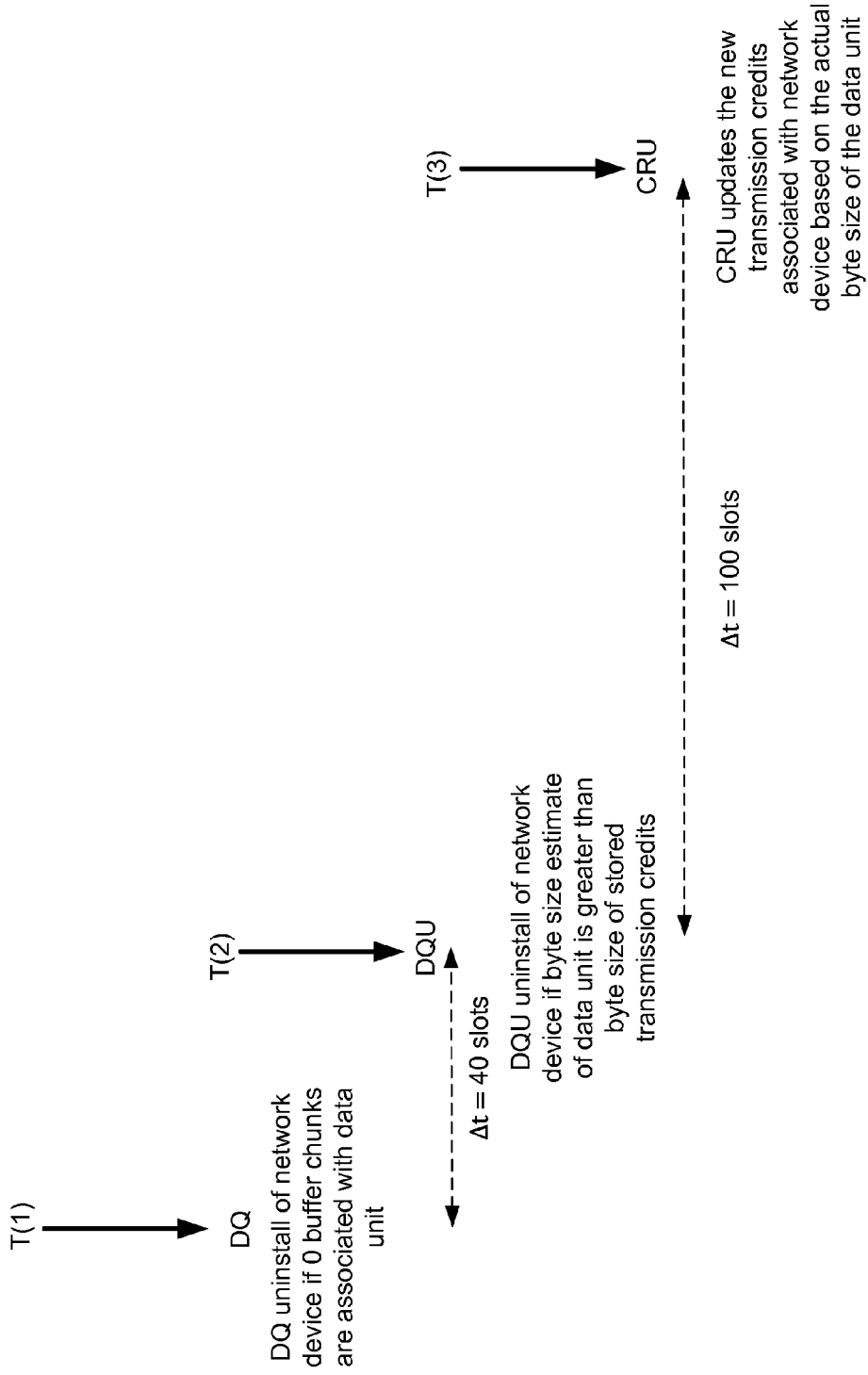
FIG. 3 is a schematic illustration of an example of a transmission data scheduler scheduling a data unit for transmission to a network device and/or a queue in a network, according to an embodiment.

FIG. 3 is a schematic illustration of an example of a transmission data scheduler scheduling a data unit for transmission to a network node and/or a queue in a network, according to an embodiment. The timeline 300 illustrated in FIG. 3 includes three transmission data scheduler threads that are involved with the scheduling operations such as, for example, the dequeue (DQ) thread, the dequeue update (DQU) thread and the transmission credit update (CRU) thread. In FIG. 3, the DQ thread selects a buffer chunk or a set of buffer chunks associated with data units to send to network nodes and/or a queues in the network. The DQ thread performs the selection by analyzing the network hierarchy from the L1 network node (e.g., L1 network node labeled as 130 in FIG. 1) to the queues (e.g., queues labeled "Q" in FIG. 1) to determine which path (i.e., between an L1 node and a queue Q) includes sufficient transmission credits to schedule transmission of a data packet. For example, for the DQ thread to schedule transmission of a data unit to a queue Q, each node (including the queue Q) between the network node 120 and the queue can include sufficient transmission credits.

The DQ and DQU threads are separated in time by a latency that is a function of the time taken by a transmission data scheduler to obtain information representing the number of buffer chunks associated with a data unit scheduled to be sent to a network node and/or a queue and the capacity of each of the buffer chunks (e.g., from off-chip memory). The DQ thread, the DQU thread and the CRU thread can be performed by the transmission schedule module (e.g., transmission schedule module labeled 222 in FIG. 2) using the CPQ stored in the on-chip memory (e.g., memory labeled as 240 in FIG. 1). For example, in FIG. 3, the DQ thread can select a data unit to send to a network node and/or a queue at time T(1). At time T(2), the DQU thread can obtain information representing the number of buffer chunks associated with the data unit scheduled to be sent to the network node and/or the queue and the capacity of each of the buffer chunks. T(2) is separated in time from T(1) by, for example, 40 slots (e.g., one slot can equal a number of clock cycles such as, for example, one clock cycle, four clock cycles, eight clock cycles, etc.). Hence, in this example, the memory latency is 40 slots before the buffer chunk information associated with a data unit is determined using the DQU thread. Similarly stated, the latency to receive the number of buffers and/or the pointers to the buffers used to store the data unit from off-chip memory can be 40 slots. During these 40 time slots, the DQ thread can schedule, select and/or identify additional data units to be sent to one or more network nodes and/or queues.

In some instances, a network node and/or a queue in a network can be uninstalled (e.g., data units no longer scheduled to be sent to that network node and/or queue) during execution of the DQ thread at time T(1) if no data units can be identified and/or scheduled by the transmission data scheduler at time T(1) for a network node and/or a queue. In such instances, no buffer chunks in the off-chip memory (i.e., memory labeled 122 in FIG. 1) are associated with the network node and/or the queue.

After the DQU obtains the information representing the number of buffer chunks associated with a data unit scheduled to be sent to a network node and/or a queue and the capacity of each of the buffer chunks, the transmission rate count module can generate an estimate of the byte size of the data unit scheduled for transmission to the network device. For example, if each buffer chunk has a capacity of 128B and ten buffer chunks are associated with the data unit, the data unit is estimated to have a byte size of 1280B (i.e., the transmission rate count module assumes that the entire capacity of each buffer is used to store the data unit). After generating the size estimate of the data unit, the temporary rate counter for that network device (e.g., temporary rate counter 226 of FIG. 2) is updated to reflect a temporary transmission count or value (by subtracting the estimated byte size of the data unit scheduled for transmission from the byte size of the transmission credits stored or accumulated for the network node and/or the queue). In some instances, at time T(2), the relevant network node and/or queue can be uninstalled if the value of the temporary transmission counter (e.g., a temporary transmission count) meets and/or satisfies a criterion (e.g., is negative, crosses a threshold, etc.). In such instances, the DQ thread can stop further scheduling of data units to the relevant network device. In other instances, at time T(2), the DQ thread can continue scheduling additional data units for transmission to the relevant network node and/or queue if the value of the temporary transmission counter (e.g., a temporary transmission count) fails to meet and/or satisfy the criterion (e.g., is non-negative, does not cross a threshold, etc.).

A relatively large latency (e.g., 100 slots) occurs between the time T(2) (when the DQU thread receives the indication of the number of buffers used to store the data unit) and time T(3) (when the CRU thread receives an indication of the actual byte size of the data unit). This is because the transmission data scheduler fetches and/or obtain information representing the actual byte size of the data unit stored in the different buffer chunks from the off-chip memory (e.g., memory labeled 122 in FIG. 1) at time T(3). In some embodiments, the CRU thread receives the data unit from the buffers and can calculate and/or determine the actual size of the data unit using the data unit itself.

After obtaining the relevant data unit information, the CRU thread updates the transmission rate counter (e.g., transmission rate counter 225) associated with that network node and/or queue to reflect a transmission count or value that is generated by subtracting the actual byte size of the data unit scheduled for transmission from the transmission credits stored or accumulated for the network node and/or queue in the transmission rate counter. In some instances, a network device can be uninstalled during execution of the DQU thread at time T(2) because the estimated byte size of the scheduled data unit was larger than the byte size of the stored transmission credits of the network device (i.e., based on a value of the temporary transmission rate counter 226 associated with the network node and/or queue). In such instances, the network node and/or queue can be reinstalled during execution of the CRU thread at time T(3) if the actual byte size of the data unit is determined to be less than the stored transmission credits of the network device (i.e., that network node and/or queue). In some embodiments, the temporary transmission rate counter associated with that network device can be rectified and/or updated to correspond with the transmission rate counter associated with the network device.

A desirable attribute of a transmission data scheduler is the ability of the scheduler to process each data unit at one time and deduct the actual byte size of the data unit from the byte size of the stored transmission credits (associated with a network device in a network) to generate a perpetual transmission count or value. The (negative or non-negative) perpetual transmission count or value can then be used to determine if a network device is to be uninstalled from the network. The buffer chunks associated with the data unit scheduled for transmission to a network device and information representing the actual data unit size is often stored in an external or off-chip memory. Hence, waiting to obtain the relevant information before the transmission data scheduler proceeds to the next data unit can significantly impact the performance of the transmission data scheduler due to the high latency associated with accessing information and/or data stored in an external or off-chip memory. Therefore, to operate at an efficient performance level, the scheduling decisions by the transmission data scheduler can be made to overlap the external memory access latency period. Because the scheduling (DQ), buffer chunk delivery (DQU) and transmission credit accounting (CRU) threads are significantly separated in time, it is possible for more data units to be transmitted to a network node and/or a queue than desired (or pre-determined). The byte size of the data units sent to a network node and/or a queue beyond the desired (or pre-determined) scheduling goal is referred to as the skid value.

Deciding to suspend scheduling transmission of data packets to a network node and/or a queue based on byte size estimation of the data unit at time T(2) rather than at time T(3) can significantly reduce the skid value because the DQ-DQU latency is 40 slots as compared to the DQ-CRU latency, which is 140 slots. This estimation of the byte size of the data unit can be referred to as a speculative charge. The speculative charge can determine the state of a network node and/or a queue (either at a first installed state or at a second uninstalled state), and can signal the transmission data scheduler to transition a network node and/or a queue from the first state to the second state or vice versa.

Figure 4:
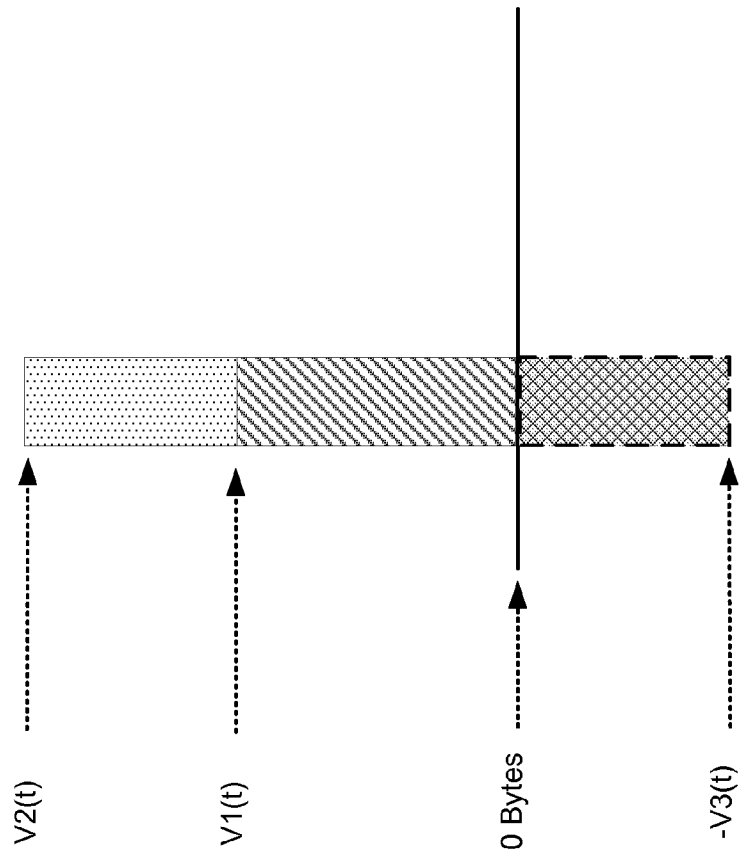
FIG. 4 is a schematic illustration of a transmission rate counter associated with a network node and/or a queue, according to an embodiment.

FIG. 4 is a schematic illustration of a value of a transmission rate counter associated with a network node and/or a queue, according to an embodiment. The transmission rate counter 400 includes finite number of transmission credits stored denoted by $V1(t)$ before at a time t. In FIG. 4, $V1(t)$ can represent, for example, the number of transmission credits stored in the transmission rate counter at time t. In some embodiments, the transmission credits can represent, correspond to and/or be indicative of a number of bytes that can be scheduled to be sent to a network device associated with that transmission rate counter. $V2(t)$ is the clip value that has been assigned to the network node and/or queue by the transmission schedule module at time t. Similar to the case of the stored transmission credits, $V2(t)$ can represent, for example, a maximum number of transmission credits that can be stored at one time for the network device. The skid value associated with the network device at time t is represented by $-V3(t)$, where $-V3(t)$ can represent, correspond to and/or be indicative of a byte size of the data units that are scheduled to be sent to a network node and/or a queue beyond the desired (or pre-determined) scheduling goal at time t.

Speculative charging typically is based on the assumption that the buffer chunks associated with a data unit are full. It is, however, possible that data units of a finite size can occupy portions of a buffer chunk. For example, in some instances, a 64B data unit can be located in a 128B buffer chunk and byte size of the transmission credits stored for a network device can be 100B. In such instances, the size estimation of the data unit can be based on one buffer chunk that is 128B. Hence, the network device can be prematurely uninstalled during execution of the DQU thread at time T(2) as referred to in FIG. 3 while positive transmission credits remain for the network device based on the actual data unit size and not the estimated data unit size. When the burst size or clip value (where a clip value is the maximum value of transmission credits that can be associated with a network node and/or a queue and is set by the transmission schedule module) is set close to the value of the transmission credits being added for a network node and/or a queue during each transmission credit update period, it is possible that a portion of the transmission credits being sent to a network device can be lost during a transmission credit update period (stored transmission credits+newly received transmission credits>clip value). For example, if the network device is uninstalled based on a size estimate but 36B remain in a transmission rate counter with a clip of 100B, if 100B of transmission credits are subsequently provided to the transmission rate counter, the transmission rate counter will only be able to accept 64B instead of the full 100B. Thus, the transmission rate counter will effectively lose the 36B. The amount of error in this case is equal to the ratio of the speculative charge to the actual data unit size (e.g., 128B/64B=2:1 error). If this error is not addressed, then the shaped rate that a network device can achieve might be 50% (½×) of the expected shaped rate. One method to compensate for the error described above is to increase the clip value associated with the network device by an amount that is twice the amount of transmission credits issued or sent to a network node and/or a queue during each transmission credit update period. In a transmission credit scheduler system where the transmission credits are dynamically scaled, increasing the clip value by 2-fold can, however, increase the data unit burst size by an undesirable amount that can adversely affect network performance.

Another method to address the 2:1 speculative error is to allow the transmission credits in a transmission credit update period to be added to the stored transmission credits when the stored credits are less than the clip value. This can allow the new transmission credit value (stored transmission credits+ newly received transmission credits) to exceed the clip value by a factor of 2:1 without any loss of transmission credits. In such a method, where the stored transmission credits are equal to the clip value, no additional transmission credits are added to avoid introducing large data bursts that can adversely affect network functionality. Typically, when the stored transmission credits are below the clip value, the transmission data scheduler is scheduling data units to be sent to the network device and transmission credits are being consumed in each subsequent transmission credit update period. Hence, in such instances, the amount of new transmission credit addition to the rate counters associated with the queue and/or network device can be relatively small.

In some instances, when exceeding the pre-determined clip value associated with a network device by a large amount during a transmission credit update period is problematic, a second upper limit may be set to reduce the transmission credits that are allowed to exceed the clip particularly when the amount of transmission credits sent in a transmission credit update period is large. The second threshold can be based on the magnitude of the shaping rate or the amount of transmission credits received in each transmission credit update cycle because the transmission credits are to be preserved. For example, in some instances, when a low transmission credit scheduling rate is implemented for a network node and/or a queue associated with stored transmission credits with low byte sizes, a second upper limit can be set that is equal to twice the clip value. In such instances, the possibility of being unable to accept newly-received transmission credits because of a low clip value is reduced during a transmission credit update period and shaping accuracy can be maintained. In such instances, the amount of additional data burst is small even when exceeding the original pre-determined clip associated with the network node and/or queue. In other instances, when a high transmission credit scheduling rate is implemented for a network node and/or a queue associated with stored transmission credits with large byte sizes, a second upper limit can be set that is relatively small compared to the clip value to limit the additional burst size beyond the pre-determined clip value associated with the network device. In yet other instances, where the transmission data scheduler is not actively sending data units to a network device and the value of the stored transmission credits for that network device is equal to or greater than the pre-determined clip value set for the network device, no further accumulation of transmission credits occur during a transmission credit update period to prevent excess data bursts that can adversely affect network performance.

Figure 5:
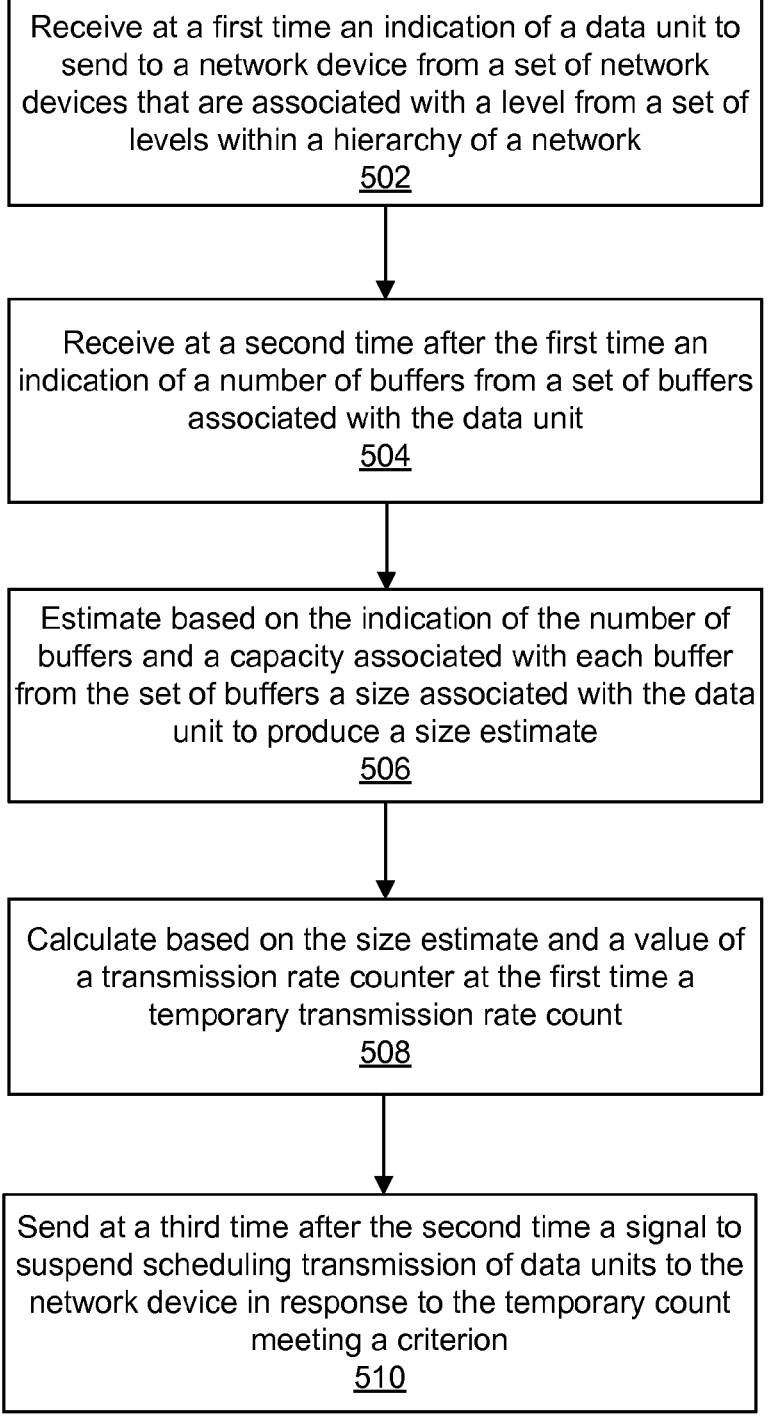
FIG. 5 is a flow chart illustrating a method of sending a data unit from a transmission data scheduler to a network node and/or a queue, according to an embodiment.

FIG. 5 is a flow chart illustrating a method of sending a data unit from a transmission data scheduler to a network node and/or a queue, according to an embodiment. The method 500 includes receiving at a first time at, for example, a transmission schedule module, an indication of a data unit to send to a network device from a set of network devices that are associated with a level from a set of levels within a hierarchy of a network, at 502. As described above, the transmission schedule module can be a hardware module and/or a software module stored in the memory and/or executed in the processor of the transmission data scheduler. The transmission schedule module is operatively coupled to the transmission rate count module and can identify data units to send to different network devices in the network.

At 504, an indication is received at, for example, the transmission schedule module at a second time after the first time that is representative of a number of buffer chunks from a set of buffer chunks associated with the data unit scheduled to be sent to a network device from a set of network devices (network nodes and/or queues) in the network. As described above, each buffer chunk is a finite sized location in the memory of the network node and/or a queue in the network device and is a specific data structure where, for example, data units and/or control instructions can be stored and held to be processed at a later time.

At 506, an estimate of the byte size of the data unit is performed at, for example, the transmission schedule module, based on the indication of the number of buffers (in a set of buffers) associated with the data unit and the capacity associated with each buffer from the set of buffers. For example, if ten buffer chunks are associated with a data unit and the size of each of the buffer chunk is 128B, the estimate of the byte size of the data unit can be 1,280B. In some configurations, the principal operations performed on the buffer can be the addition of new entities to the rear terminal position of the queue, and removal of currently stored entities from the front terminal position of the queue. In such configurations, a buffer can be termed as a First-In-First-Out (FIFO) data structure.

At 508, a temporary transmission rate count or a temporary byte size of the data unit is calculated, at for example, the transmission schedule module and based on the size estimate and a value of a transmission rate counter at the first time. As described above, such temporary transmission rate count values are associated with data units assigned or scheduled for a network device in a hierarchical network. At 510, a signal is sent by, for example, the transmission schedule module at a third time after the second time to suspend scheduling transmission of data units to the network device (a network node and/or a queue) in response to the temporary count meeting a criterion. As described above, the criterion can be met when the data units scheduled for transmission to a network device has exceeded the transmission credit value associated with (or accumulated for) the network device in a given time period. As described above, a transmission credit can provide an indication or a representation of a rate at which a network device can transmit data units to other network devices from the set of network devices in a network.

The methods of implementing a dynamic transmission data scheduler for scheduling data units to be sent to network devices as described in FIGS. 1-5 offers several advantages. For example, a reduction in the scale of the computational resources can be achieved by using an estimate of data unit size in shaping to reduce data burst size in a pipelined transmission data scheduler with a large memory latency. In such methods, a transmission data scheduler can use the size estimate of a data unit to make shaping or scheduling decisions before the actual data unit size can be read from an external (off-chip) memory that involves a large latency. In such methods, estimation of the byte size of the data units can be performed based on the number of buffer chunks associated with the data unit and the capacity of each of the buffer chunks. Additionally, information related to the number of buffer chunks used to estimate the byte size of a data unit can be stored in an PCC on the on-chip memory. This method involves use of significantly less memory than storing the "actual" value of the byte size of the data unit represented by the transmission rate counter in the on-chip memory.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a transmission schedule module implemented in at least one of a memory or a processing device, the transmission schedule module configured to select, at a first time, a data unit to send to a network device from a plurality of network devices based at least in part on a value of a transmission rate counter at the first time indicating that the network device is in a first state,
the transmission schedule module configured to receive, at a second time after the first time, an indication of a number of buffers from a set of buffers associated with the data unit,
the transmission schedule module configured to calculate a size estimate based on the indication of the number of buffers and a capacity associated with each buffer from the set of buffers,
the transmission schedule module configured to calculate, based on the size estimate and a value of the transmission rate counter at a third time after the second time, a temporary transmission rate count, the transmission schedule module configured to send a signal to transition the network device from the first state to a second state if the temporary transmission rate count meets a criterion.

2. The apparatus of claim 1, wherein the transmission schedule module is implemented on a chip different from a chip implementing the set of buffers.

3. The apparatus of claim 1, wherein the transmission schedule module is configured to select a maximum value of the transmission rate counter based on a rate at which transmission credits are provided to the transmission rate counter over a period of time including the first time, the second time and the third time.

4. The apparatus of claim 1, wherein each network device from the plurality of network devices is associated with a level from a plurality of levels in a network hierarchy.

5. The apparatus of claim 1, wherein the network device includes at least one of a receive queue, a network switch or a network router.

6. The apparatus of claim 1, wherein a size of data stored in a buffer from the set of buffers at the second time is different than the capacity associated with the buffer from the set of buffers.

7. The apparatus of claim 1, wherein the transmission schedule module is configured to schedule data transmissions to the network device when the network device is in the first state, the transmission schedule module configured to suspend scheduling data transmissions to the network device when the network device is in the second state.

8. A method, comprising:
receiving, at a first time, an indication of a data unit to send to a network device (1) from a plurality of network devices and (2) associated with a level from a plurality of levels within a hierarchy of a network;
receiving, at a second time after the first time, an indication of a number of buffers from a set of buffers associated with the data unit;
estimating, based on the indication of the number of buffers and a capacity associated with each buffer from the set of buffers, a size associated with the data unit to produce a size estimate;
calculating, based on the size estimate and a value of a transmission rate counter at the first time, a temporary transmission rate count; and
sending, at a third time after the second time, a signal to suspend scheduling transmission of data to the network device in response to the temporary transmission count meeting a criterion.

9. The method of claim 8, wherein the network device is at least one of a receive queue, a network switch or a network router.

10. The method of claim 8, wherein the receiving the indication of the data unit includes receiving the indication of the data unit at a transmission schedule module, the transmission schedule module being implemented on a first chip, the set of buffers being implemented on a second chip different from the first chip.

11. The method of claim 8, further comprising:
receiving, at a fourth time after the third time, an indication of the size associated with the data unit;
updating, based on the indication of the size, the value of the transmission rate counter; and
sending a signal to allow scheduling transmission of data to the network device in response to the value of the transmission rate counter not meeting the criterion.

12. The method of claim 8, wherein a size of data stored in a buffer from the set of buffers at the second time is different than the capacity associated with the buffer from the set of buffers.

13. The method of claim 8, further comprising:
selecting a maximum value of the transmission rate counter based on a rate at which transmission credits are provided to the transmission rate counter over a period of time including the first time, the second time and the third time.

14. The method of claim 8, wherein the receiving the indication of the data unit includes receiving the indication of the data unit based at least in part on the value of the transmission rate counter not meeting the criterion at the first time.

15. An apparatus, comprising:
a transmission rate count module implemented in at least one of a memory or a processing device, the transmission rate count module configured to store a value associated with transmission credits for a network device from a plurality of network devices; and
a transmission schedule module operatively coupled to the transmission rate count module, the transmission schedule module configured to select, at a first time, a data unit to send to the network device based at least in part on the value at the first time not meeting a criterion,
the transmission schedule module configured to calculate, based on a size estimate associated with the data unit and a value at a second time after the first time and associated with transmission credits for the network device, a temporary transmission count, the transmission schedule module configured to send a signal to suspend scheduling transmission of data to the network device in response to the temporary transmission count meeting a criterion,
the transmission rate count module configured to receive, at a third time after the second time, an indication of an actual size associated with the data unit, the transmission rate count module configured to update a value at the third time and associated with transmission credits for the network device based on the actual size associated with the data unit.

16. The apparatus of claim 15, wherein the transmission schedule module is configured to send a signal to allow scheduling transmission of data to the network device in response to a value at a fourth time after the third time and associated with transmission credits for the network device not meeting the criterion.

17. The apparatus of claim 15, wherein the transmission schedule module is configured to receive, at a fourth time after the first time and before the second time, an indication of a number of buffers from a set of buffers associated with the data unit, the transmission schedule module configured to calculate the size estimate based on the indication of the number of buffers and a capacity associated with each buffer from the set of buffers.

18. The apparatus of claim 15, wherein the transmission rate count module is configured to receive, at a substantially periodic rate and from a rate distribution module, an indication to modify the value.

19. The apparatus of claim 15, wherein the transmission schedule module is configured to select a maximum value associated with transmission credits for the network device based on a rate at which transmission credits are provided to the transmission rate count module.

20. The apparatus of claim 15, wherein the network device is at least one of a receive queue, a network switch or a network router.

* * * * *